United States Patent
Le

(10) Patent No.: US 9,755,924 B2
(45) Date of Patent: Sep. 5, 2017

(54) NETWORK RESOURCE REQUIREMENTS OF TRAFFIC THROUGH A MULTIPLE STAGE SWITCH NETWORK

(71) Applicant: The Boeing Company, Seal Beach, CA (US)

(72) Inventor: Tu Q. Le, Cerritos, CA (US)

(73) Assignee: The Boeing Company, Chicago, IL (US)

( * ) Notice: Subject to any disclaimer, the term of this patent is extended or adjusted under 35 U.S.C. 154(b) by 444 days.

(21) Appl. No.: 14/243,150

(22) Filed: Apr. 2, 2014

(65) Prior Publication Data

US 2015/0288583 A1    Oct. 8, 2015

(51) Int. Cl.
*H04L 12/26* (2006.01)
*H04L 12/721* (2013.01)
(Continued)

(52) U.S. Cl.
CPC ............. *H04L 43/08* (2013.01); *H04L 45/70* (2013.01); *H04L 49/1515* (2013.01); *H04L 49/50* (2013.01)

(58) Field of Classification Search
CPC ... H04L 49/25; H04L 49/1515; H04L 49/205; H04L 49/101; H04L 49/1523; H04L 49/1576; H04L 49/1569; H04L 49/50; H04L 47/10; H04L 47/125; H04L 47/22; H04L 47/2441; H04L 47/2416; H04L 47/72; H04L 45/00; H04L 45/38; H04L 45/70; H04L 45/127; H04L 43/08; H04L 43/0882; H04L 41/0896; H04L 12/26; H04L 12/721
See application file for complete search history.

(56) References Cited

U.S. PATENT DOCUMENTS

| | | | |
|---|---|---|---|
| 2002/0146003 A1 | 10/2002 | Kam et al. | |
| 2012/0170585 A1* | 7/2012 | Mehra | H04L 45/24 370/400 |
| 2015/0043905 A1* | 2/2015 | Graves | H04Q 11/0005 398/25 |

OTHER PUBLICATIONS

Scott, "Routing Information Through a Blocking Splitter-Combiner Network," USPTO Patent Application, filed Jan. 16, 2013, (11-0941-US-NP) 33 pages.
(Continued)

*Primary Examiner* — Ian N Moore
*Assistant Examiner* — Brian T Le
(74) *Attorney, Agent, or Firm* — Womble Carlyle Sandridge & Rice LLP

(57) ABSTRACT

An apparatus is provided for implementation of a system for assessing traffic through a multiple stage switch network. The apparatus may receive an indication of traffic to be routed through a multiple stage switch network configured to route the traffic from one or more input ports to one or more output ports according to a type of the traffic. The apparatus may calculate a network resource requirement of the traffic based on the input port(s), output port(s) and type of the traffic. Here, the network resource requirement may be calculated according to an algorithm specific to the type of the traffic, but generalized to any specific route of the traffic through the multiple stage switch network. And the apparatus may assess the traffic based on a comparison of a capacity of the multiple stage switch network, and the network resource requirement of the traffic.

15 Claims, 13 Drawing Sheets

(51) Int. Cl.
H04L 12/933 (2013.01)
H04L 12/931 (2013.01)

(56) References Cited

OTHER PUBLICATIONS

Clos, "A Study of Non-Blocking Switching Networks," Bell System Technical Journal, vol. 32, No. 2, Mar. 1953, pp. 406-424.
"Introduction to Clos Networks," Stanford University, http://www.stanford.edu/class/ee384y/Handouts/clos_networks.pdf, accessed Jun. 7, 2013, 1 page.
"Clos Network," Wikipedia Foundation, Inc., http://en.wikipedia.org/wiki/Clos_network, last modified Mar. 16, 2013, accessed Apr. 16, 2013, 5 pages.
European Search Report dated Sep. 1, 2015 for Application No. 15160879.1.
Anujan Varma et al., "An Incremental Algorithm for TDM Switching Assignments in Satellite and Terrestrial Networks", IEEE Journal on Selected Areas in Communications, vol. 10, No. 2, Feb. 1992, XP000272921.
H. Jonathan Chao et al., "Matching Algorithms for Three-Stage Bufferless Clos Network Switches", IEEE Communications Magazine, Oct. 2003, XP1184677.
Jin-Chyang Jiau et al., "An Integrated Strategy of Resource Engineering and Control for ATM Networks", IEEE, 1996, XP10220313.

* cited by examiner

NETWORK RESOURCE REQUIREMENTS OF TRAFFIC THROUGH A MULTIPLE STAGE SWITCH NETWORK

CROSS-REFERENCE TO RELATED APPLICATION(S)

The present application is related to U.S. patent application Ser. No. 13/922,670, entitled: Switch Routing Algorithm, filed on Jun. 20, 2013, and published as U.S. Patent Application Publication No. 2014/0376546, the content of which is incorporated herein by reference in its entirety.

TECHNOLOGICAL FIELD

The present disclosure relates generally to multiple stage switch networks and, in particular, to assessing traffic through a multiple stage switch network such as a Clos switch network based on network resource requirements of the traffic.

BACKGROUND

Network managers seek ways to move message traffic from senders to recipients more quickly and more cheaply. Such managers endeavor to use existing installed switching hardware and software more efficiently. More efficient use may lead to productivity improvements while avoiding the need for further investment. By spreading network load more efficiently over currently available switching resources, the goals of greater productivity without incremental capital investment may be achieved.

Networks may become congested or otherwise burdened with excessive message volume or other processing problems due to improper or lack of load balancing between switches and other hardware. Some hardware may be excessively loaded while neighboring hardware may sit underutilized. Information technology managers may unnecessarily make investment in new hardware and software when existing networks are not optimally configured.

Multiple stage switch networks such as Clos networks have been developed to address some of the above issues. But while these switch networks increase the ability to move traffic, they still have resource or capacity constraints that must be accounted for when deciding whether traffic through the switch network is feasible. Accordingly, it would be beneficial to have a method and apparatus that further takes into account the capacity constraints of a multiple stage switch network, as well as possibly other issues.

BRIEF SUMMARY

Example implementations of the present disclosure are generally directed to multiple stage switch networks and, more particularly, to assessing traffic through a multiple stage switch network such as a Clos switch network based on network resource requirements of the traffic. In accordance with example implementations, the network resource requirements may be calculated based on a type of the traffic. In this regard, the network resource requirements may be calculated according to an algorithm specific to the type of traffic. But while specific to the type of traffic, the algorithm may be generalized to any specific route of the traffic through the multiple stage switch network According to one aspect of example implementations of the present disclosure, an apparatus is provided for implementation of a system for assessing traffic through a multiple stage switch network. The apparatus includes a processor and a memory storing executable instructions that in response to execution by the processor cause the apparatus to perform at least a number of operations. In this regard, the apparatus may be caused to receive an indication of traffic to be routed through a multiple stage switch network configured to route the traffic from one or more input ports to one or more output ports according to a type of the traffic. The apparatus may be caused to calculate a network resource requirement of the traffic based on the input port(s), output port(s) and type of the traffic. Here, the network resource requirement may be calculated according to an algorithm specific to the type of the traffic, but generalized to any specific route of the traffic through the multiple stage switch network. And the apparatus may be caused to assess the traffic based on a comparison of a capacity of the multiple stage switch network, and the network resource requirement of the traffic.

In some examples, the multiple stage switch network includes a number of ingress switches, a number of middle switches and a number of egress switches. In these examples, the traffic is to be input on the input port(s) to respective ingress switch(es), and output on the output port(s) from respective egress switch(es), and the number of middle switches may determine the capacity of the multiple stage switch network.

In some examples, the apparatus may be caused to calculate a resource requirement value according to the algorithm for each ingress switch, and each egress switch. In these examples, the apparatus may be caused to assess the traffic based on a comparison of the capacity of the multiple stage switch network, and the resource requirement value for each ingress switch and egress switch. In some further examples, for each ingress switch, the apparatus may be caused to calculate a sum of traffic-type requirement values for one or more different types of the traffic input to the ingress switch. Similarly, for each egress switch, the apparatus may be caused to calculate a sum of traffic-type requirement values for one or more different types of the traffic output from the egress switch.

In some examples, the type of the traffic may be one-to-one traffic in which traffic from an input port is routed to a respective output port.

In some examples, the type of the traffic may be one-to-many or many-to-many in which traffic from an input port of the input port(s) is routed to multiple output ports of the output port(s). In these examples, the algorithm may include a performance parameter selected to favor more or less network resource usage at the ingress switches to route the traffic through the multiple stage switch network.

In some examples, the type of the traffic may be many-to-one or many-to-many in which traffic from multiple input ports of the input port(s) is routed to an output port of the output port(s). In these examples, the algorithm may include a performance parameter selected to favor more or less network resource usage at the middle switches to route the traffic through the multiple stage switch network.

In some examples, the apparatus may be caused to calculate the network resource requirement of the traffic and any other, existing traffic on the multiple stage switch network. In these examples, the apparatus may be caused to assess the traffic based on a comparison of the capacity of the multiple stage switch network, and the network resource requirement of the traffic and existing traffic.

In other aspects of example implementations, a method and computer-readable storage medium are provided for assessing traffic through a multiple stage switch network.

The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
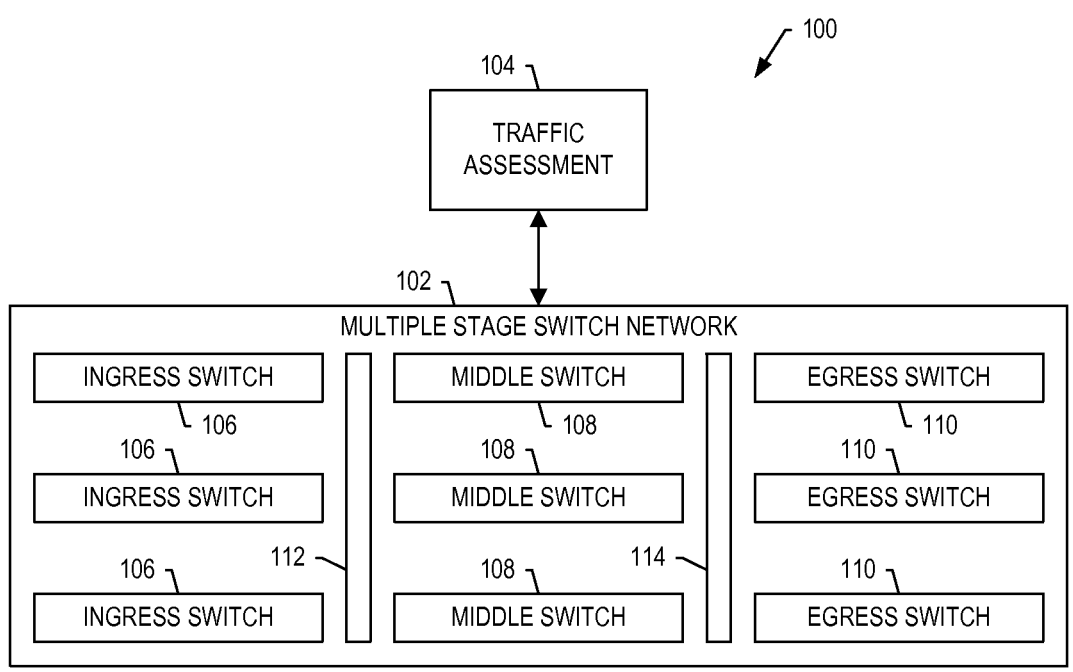
FIG. 1 illustrates a switch-analysis system according to some example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

FIG. 1 illustrates a switch-analysis system 100 according to some example implementations of the present disclosure. The switch-analysis system may include any of a number of each of a number of different subsystems (each an individual system) coupled to one another for performing one or more functions or operations. As shown in FIG. 1, for example, the switch-analysis system may include a multiple stage switch network 102, and a (traffic assessment) system 104 for assessing traffic through the multiple stage switch network. Although shown together, it should also be understood that either or both of the multiple stage switch network or traffic assessment system may function or operate as a separate system without regard to the other. The multiple stage switch network in some examples may operate onboard a communications satellite, such as within a transponder of such a communications satellite. It should also be understood that the switch-analysis system may include one or more additional or alternative subsystems than those shown in FIG. 1. One example of such a subsystem is described further in the above referenced and incorporated '670 application.

The multiple stage switch network 102 may include groups of switches arranged in a plurality of stages, such as in a time division multiple access (TDMA) multi-stage Clos switch network. A TDMA crossbar switch may be referred to as digital symmetric matrices (DSM). A Clos switch network may be appropriate when physical circuit switching needs exceed capacity of the largest feasible single crossbar switch. The complexity associated with implementing a crossbar, which may be a number of cross points, may be proportional to the square of the number of inputs/outputs, while with Clos network complexity may be linear. A required number of cross points (which make up each crossbar switch in the Clos switch network) may be fewer than were the entire multiple stage switch network implemented with a single large crossbar switch.

As shown, the multiple stage switch network 102 may include an ingress stage, middle stage and egress stage—the ingress stage and egress stage at times referred to as the "input stage" and "output stage." Each stage includes a respective number of switches, namely a number of ingress switches 106 (sometimes referred to as "ingress stage switches"), a number of middle switches 108 (sometimes referred to as "middle stage switches") and a number of egress switches 110 (sometimes referred to as "egress stage switches"). The middle switches may be coupled to the ingress switches and egress switches via respective interconnects 112, 114; and in some examples, the number of middle switches may determine the capacity of the multiple stage switch network. The switches of each stage may in some examples be crossbar switches with the same number of inputs and outputs. In this regard, the multiple stage switch network may generally support switching between input and output of each ingress switch, middle switch and egress switch.

Traffic (e.g., message, data, call) entering an ingress switch 106 may be routed across the interconnect 112 to any available middle switch 108. The traffic may then move through the available middle switch and across the interconnect 114 to a relevant egress switch 110. In this regard, a middle switch may be considered available for particular new traffic if both links connecting the ingress switch to the middle switch, and connecting the middle switch to the egress switch, are both available.

Each of the ingress switches 106, middle switches 108 and egress switches 110 may, at a given moment, have input or receiving capacity that differs from the output capacity of the switch. In some examples, each of the various stage switches may include a plurality of channels for output and a plurality of channels for input. Each of these channels, then, may include a plurality of subchannels.

In accordance with example implementations, traffic may be routed through the multiple stage switch network 102 according to some switch routing algorithm that seeks a combination of input channels and output channels for a given switch that places a reduced burden on the multiple stage switch network and may enable a more efficient use of switch resources and support higher traffic load. Movement of traffic within the multiple stage switch network may include transmission from the output side or end of one switch to the input side of another switch across an interconnect 112, 114. In one example, traffic exiting a given output subchannel of a first switch of some stage may be transmitted across an interconnect to a given input subchannel of a second switch of some other stage, as will be explained in connection with FIGS. 2 and 3.

Figure 2:
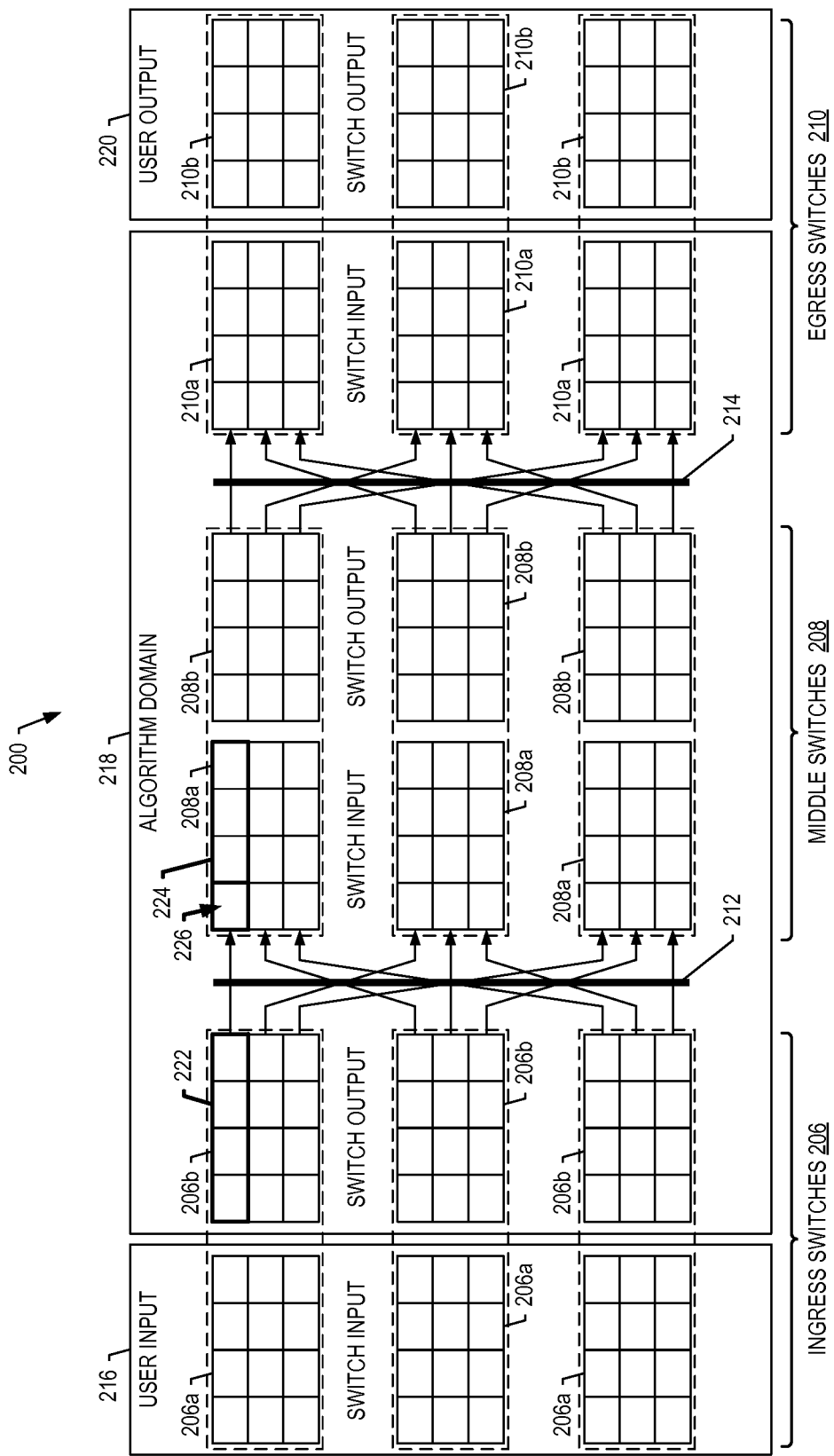
FIG. 2 is a block diagram of a multiple stage switch network, according to example implementations.

FIG. 2 is a block diagram of a multiple stage switch network 200, which in some examples may correspond to multiple stage switch network 102 of FIG. 1. As shown, the multiple stage switch network includes ingress switches 206, middle switches 208 and egress switches 210, which may correspond to respective ones of ingress switches 106, middle switches 108 and egress switches 110. The middle switches may be coupled to the ingress switches and egress switches via respective interconnects 212, 214; and in some examples, these interconnects may correspond to interconnects 112, 114.

For illustration purposes, FIG. 2 segments the ingress switches 206, middle switches 208 and egress switches 210 into and separately depicts their respective input and output functions, although the ingress switches, middle switches and egress switches may be implemented as a single physical unit. In this regard, the ingress switches may include respective switch inputs 206a and switch outputs 206b. The middle switches may include respective switch inputs 208a and switch outputs 208b. And the egress switches may include respective switch inputs 210a and switch outputs 210b.

Further for illustration purposes, the components of the multiple stage switch network 200 are shown segmented into user input 216, algorithm domain 218 and user output 220. As shown, the ingress switch inputs 206a are designated as user input since those components are receiving points for user traffic. The ingress switch outputs 206b, middle switch inputs and outputs 208a, 208b, and egress stage inputs 210a are designated as algorithm domain because it is on these components upon which a switch routing algorithm may operate. And the egress switch outputs 210b are designated as user output since those components are transmission or exit points for user traffic.

FIG. 2 also depicts a plurality of unidirectional connections that represent movement options of traffic from ingress switch outputs 206b to middle switch inputs 208a, and from middle switch outputs 208b to egress switch inputs 210a, across respective interconnects 212, 214. In some examples, supporting transmissions between components may be short-lived and may not survive once a transmission is complete.

Each of the ingress switches 206, middle switches 208 and egress switches 210 include a plurality of channels for output 222 and a plurality of channels for input 224 (one of each specifically called out in FIG. 2), and each of these channels may include a plurality of subchannels 226 (one specifically called out in FIG. 2). As shown in FIG. 2, for example, each ingress switch input 206a (i.e., the switch input of each ingress switch) provides three channels for input (depicted vertically in rows), and each of these three channels includes four subchannels (depicted horizontally in a row). Similarly, for example, each ingress switch output 206b provides three channels for output, and each of these channels includes four subchannels. Each middle switch input 208a and output 208b, and each egress switch input 210a and output 210b, may likewise provide three channels for input and output respectively, with each channel including four subchannels. The three channels of the various stages of switches may be referred to as top, middle and bottom channels.

A switch routing algorithm may determine that traffic from a given channel of a transmitting switch is sent to a specific channel of a receiving switch, and in some examples, this determination may be based on present switch utilization, and/or one or more other factors. In the example of FIG. 2, traffic leaving the middle channel 222 of the topmost shown ingress switch output 206b crosses the interconnect 212 and goes to the top channel 224 of the middle shown middle switch input 208a. Traffic from the top channel of the middle shown ingress switch output is sent to the middle channel of the topmost shown middle switch input. Traffic from the bottom channel of the bottommost shown ingress switch output is sent to the bottom channel of the bottommost shown middle switch input. The preceding are three examples of the nine total transmissions depicted from the switch outputs of the ingress switches 206 across the interconnect to the switch inputs of the middle switches 208. FIG. 2 similarly depicts nine transmissions from the switch outputs 208b of the middle switches 208 across the other interconnect to the switch inputs 210a of the egress switches 210. Other variations are possible for transmissions across either or both interconnects, and thus, this example should not be taken as limiting.

Figure 3:
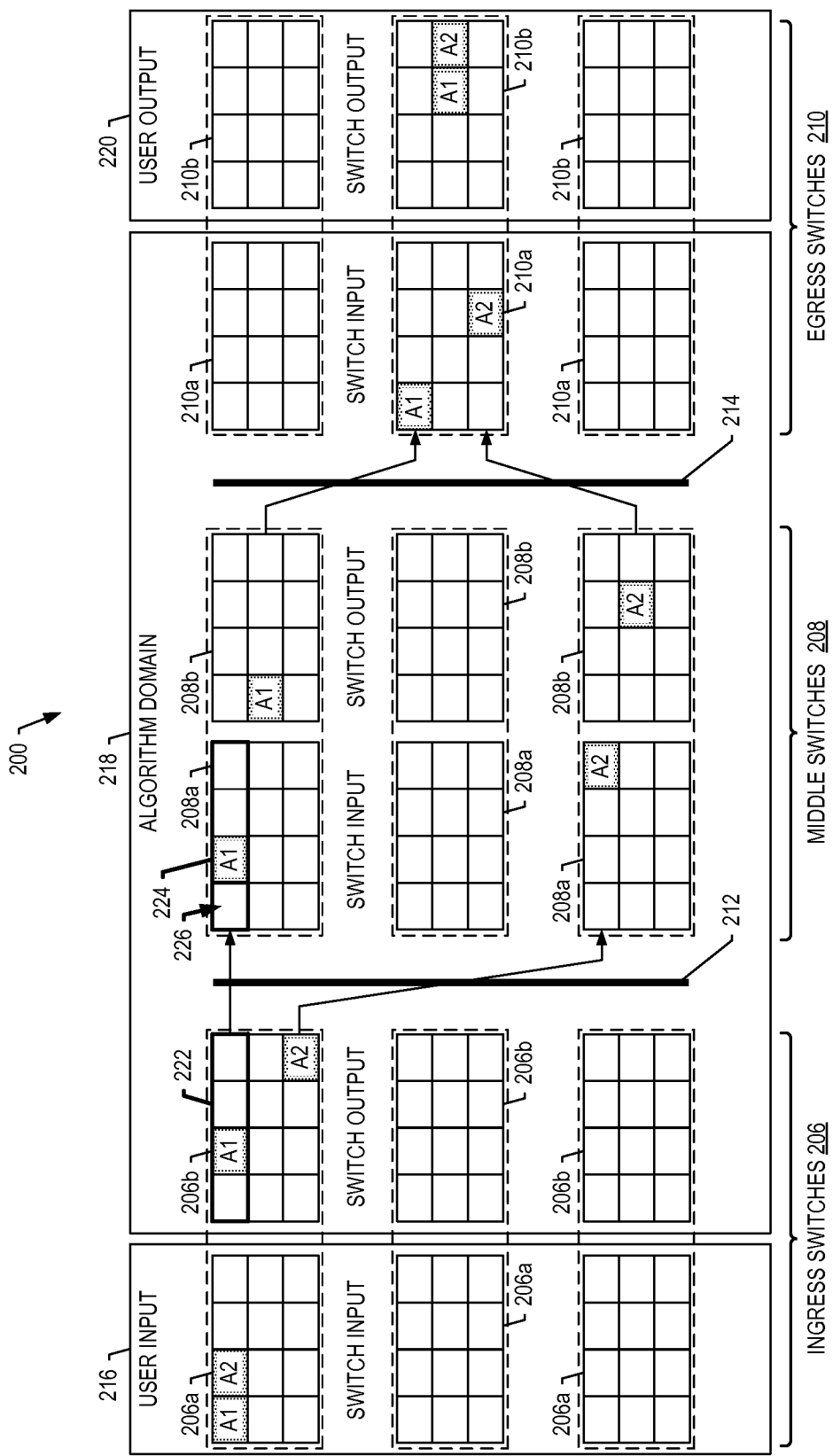
FIG. 3 illustrates an example of traffic flowing through the multiple stage switch network of FIG. 2, according to some example implementations.

FIG. 3 illustrates an example of traffic flowing through the multiple stage switch network 200 of FIG. 2, according to some example implementations of the present disclosure. FIG. 3 depicts two units of data, designated as A1 and A2, entering the multiple stage switch network at the top channel of the topmost shown ingress switch input 206a. Data A1 exits at the top channel of the topmost shown ingress switch output 206b. Data A1 exiting at the top channel of the topmost shown ingress switch output may be a two-dimensional mapping for A1 from input/channel 0 at subchannel index 00 to output/channel 0 at subchannel index 01. Data A2 exits at the bottom channel of the topmost shown ingress switch output. Transmissions across the interconnect 212 from the ingress switches 206 to the middle switches 208 may take place as described above. Data A1, then, is directed to the top channel of the topmost shown middle switch input 208a, and data A2 is directed to the top channel of bottommost shown middle switch input.

Data A1 and A2 exit the topmost and bottommost shown middle switches 208, respectively, at different subchannels from which they entered the middle switches for load or other reasons. For example, data A1 entered the topmost shown middle switch input 208a at the top channel and exits at the middle channel of the topmost shown middle switch output 208b. FIG. 3 depicts data A1 and A2 taking separate paths across the multiple stage switch network 200 from their origination point at the topmost shown ingress switch input 206a to their exit point at the middle shown egress switch output 210b. In some examples, a switch routing algorithm may determine paths across the interconnects 212, 214 that may best utilize capacity of receiving switches and deliver A1 and A2 such that load balancing may be promoted and higher traffic load may be supported. For more information on switch routing algorithms according to which traffic may be routed through the multiple stage switch network, see the above referenced and incorporated '670 application.

Figure 4:
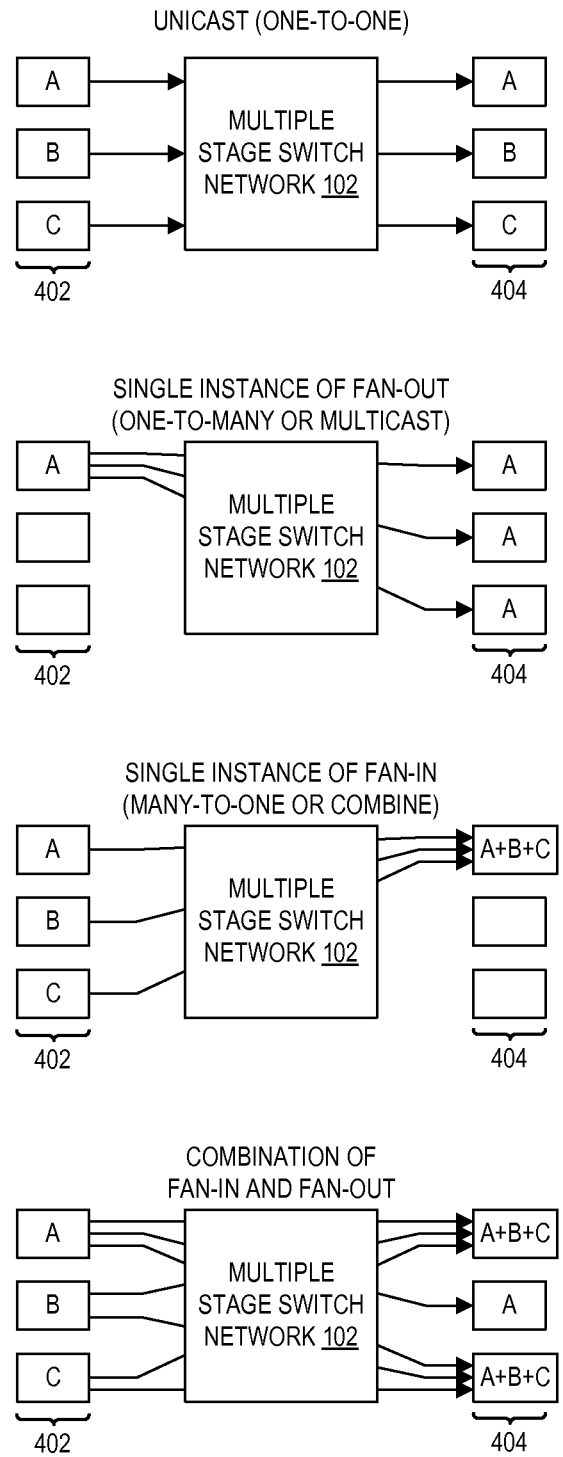
FIG. 4 illustrates different types of traffic that may be routed through a multiple stage switch network, according to some example implementations.

FIG. 4 illustrates different types of traffic—including "one-to-one," "one-to-many," "many-to-one" and "many-to-many"—that may be routed through the multiple stage switch network 102 (in some examples switch network 200), according to various example implementations. In FIG. 4, a number of small rectangles are illustrated leading into and out of the multiple stage switch network. The small rectangles leading into the multiple stage switch network represent input ports 402 to ingress switches 106, and the letters therein indicate distinct traffic input to the multiple stage switch network on those input ports. And the small rectangles leading out of the switch network represent output ports 404 from egress switches 110, and the letters therein indicate distinct traffic output from the multiple stage switch network on those output ports.

In accordance with its various types, traffic may be input on input port(s) 402 to respective ingress switch(es) 106, and output on output port(s) 404 from respective egress switch(es) 110. One-to-one traffic (at times referred to as "unicast" traffic) may be a type of traffic in which traffic from an input port is routed to a respective output port. One-to-many traffic (at times referred to as "multicast" or "fan-out" traffic) may be a type of traffic in which traffic from an input port is routed to multiple output ports. Conversely, many-to-one traffic (at times referred to as "combine" or "fan-in" traffic) may be a type of traffic in which traffic from multiple input ports is routed to an output port. Many-to-many traffic (at times referred to as "fan-in and fan-out" traffic) may be a type of traffic including characteristics of both one-to-many and many-to-one.

As shown in FIG. 4, one-to-one traffic may be represented as three distinct traffic (A, B, C) input to the multiple stage switch network 102 on respective input ports 402, and routed through and output from the multiple stage switch network on respective output ports 404. One-to-many traffic may be represented as one distinct traffic (A) input to the multiple stage switch network on a single input port, and routed through and output from the multiple stage switch network on multiple output ports. Many-to-one traffic may be represented as three distinct traffic (A+B+C) input to the multiple stage switch network on respective input ports, and routed through and output from the multiple stage switch network on a single output port. And many-to-many traffic may be represented as three distinct traffic (A+B+C) input to the multiple stage switch network on respective input ports, and routed through and output from the multiple stage switch network on one or more output ports. In many-to-many, one of the distinct traffic may be output on multiple output ports, or multiple of the distinct traffic may be output on a single output port.

Figure 5:
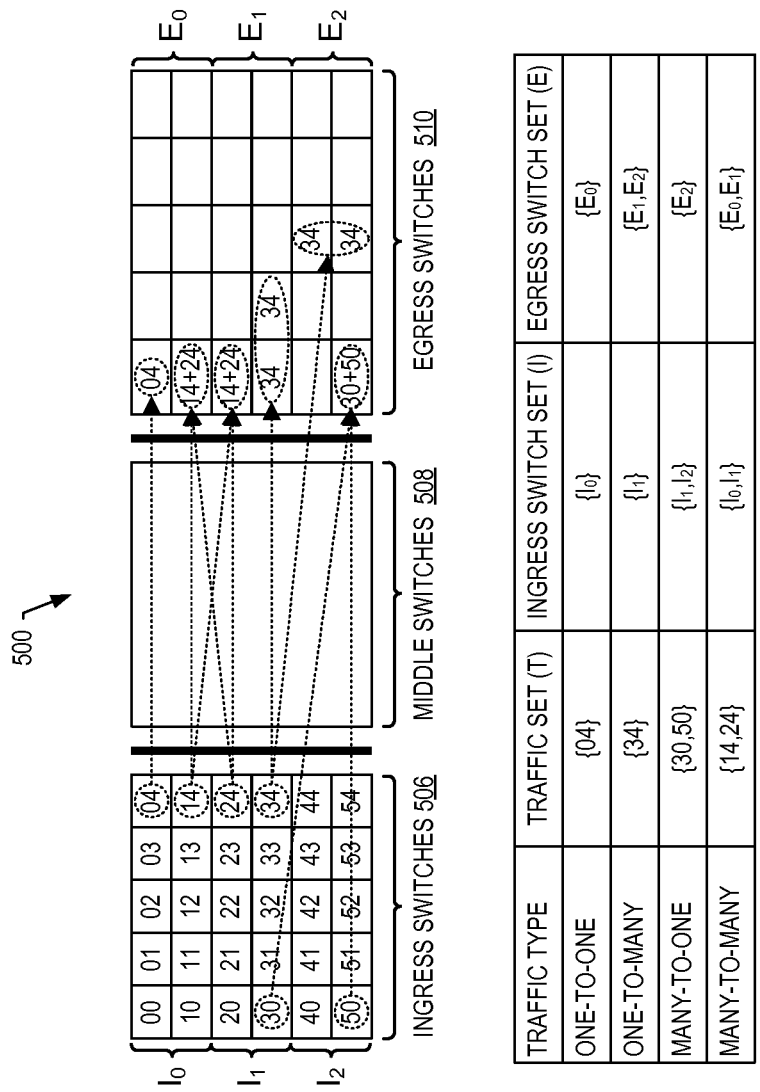
FIG. 5 illustrates a multiple stage switch network and examples of different types of traffic that may be routed through it, according to example implementations.

FIG. 5 illustrates a multiple stage switch network 500 and examples of different types of traffic that may be routed through it, combining the concepts of FIG. 2 (and FIG. 3) and FIG. 4, according to some example implementations. In some examples, the multiple stage switch network 500 of FIG. 5 may correspond to multiple stage switch network 200 of FIG. 2 (and in turn the network 102 of FIG. 1). As shown, the multiple stage switch network includes ingress switches 506, middle switches 508 (shown collectively) and egress switches 510, which may correspond to respective ones of ingress switches 206, middle switches 208 and egress switches 210.

In the example of FIG. 5, the multiple stage switch network 500 includes three ingress switches 506 (labeled $I_0$, $I_1$ and $I_2$), and three egress switches 510 (labeled $E_0$, $E_1$ and $E_2$). Each of the ingress switches and egress switches includes three channels for input/output, and each of these channels includes five subchannels. As explained above, traffic may be input on input ports to respective ingress switches, and output on output ports from respective egress switches, where these input and output ports may in some examples correspond to input and output ports 402, 404. In some examples, these input and output ports may include channels and subchannels corresponding to respective ones of the channels and subchannels of the ingress and egress switches.

The subchannels of the input ports/ingress switches 506 may be labeled according to a channel and subchannel index across the three ingress switches. Thus, for example, input port/ingress switch $I_0$ may include a channel 0 with subchannels 00, 01, 02, 03 and 04, and a channel 1 with subchannels 10, 11, 12, 13 and 14. Input port/ingress switch $I_1$ may include a channel 2 with subchannels 20, 21, 22, 23 and 24, and a channel 3 with subchannels 30, 31, 32, 33 and 34. And input port/ingress switch $I_2$ may include a channel 4 with subchannels 40, 41, 42, 43 and 44, and a channel 5 with subchannels 50, 51, 52, 53 and 54. Each of the output ports/egress switches 510 may be similarly indexed.

FIG. 5 also illustrates examples of different types of traffic that may be routed through the multiple stage switch network 500 from one or more input ports/ingress switches 506 to one or more output ports/egress switches 510, according to some example implementations. Each of four different types of traffic are shown and described below with respect to a set of traffic (T) including one or more distinct traffic routed from a set of one or more ingress switches (I) to a set of one or more egress switches (E).

As shown in FIG. 5, for example, one-to-one traffic may be routed from channel 0 at subchannel index 04 of input port/ingress switch $I_0$, to a subchannel of output port/egress switch $E_0$. In another example, one-to-many traffic may be routed from channel 3 at subchannel index 34 of input port/ingress switch $I_1$, to subchannels of output ports/egress switches $E_1$, $E_2$. In a further example, many-to-one traffic may be routed from channel 3 at subchannel index 30 of input port/ingress switch $I_1$, and from channel 5 at subchannel index 50 of input port/ingress switch $I_2$, to a subchannel of output port/egress switch $E_2$. And in yet another example, many-to-many traffic may be routed from channel 1 at subchannel index 14 of input port/ingress switch $I_0$, and from channel 2 at subchannel index 24 of input port/ingress switch $I_1$, to subchannels of output ports/egress switches $E_0$, $E_1$.

Returning now to FIG. 1 but with further reference to FIG. 4, the traffic assessment system 104 may be generally configured to assess traffic through the multiple stage switch network 102 based on network resource requirements of the traffic. In this regard, the traffic assessment system may be configured to receive an indication of traffic to be routed through the multiple stage switch network from one or more input ports 402 to one or more output ports 404 according to a type of the traffic (e.g., one-to-one, one-to-many, many-to-one, many-to-many). The traffic may include one or more distinct traffic of any of a number of different types, and may at times represent or be included within a traffic routing plan. The traffic may be traffic to be routed through the multiple stage switch network, existing traffic on the multiple stage switch network, or some combination of traffic to be routed through and any existing traffic on the multiple stage switch network.

The traffic assessment system 104 may calculate a network resource requirement of the traffic based on the input port(s) 402, output port(s) 404 and type of the traffic. As explained in greater detail below, this network resource requirement may be calculated according to an algorithm specific to the type of the traffic, but generalized to any specific route of the traffic through the multiple stage switch network 102. The traffic assessment system may then assess the traffic based on a comparison of the capacity of the multiple stage switch network, and the network resource requirement of the traffic.

In some examples, the network resource requirement may be calculated from resource requirement values, which may be calculated according to the algorithm for each ingress switch 106 of the respective ingress switch(es), to which the traffic may be input, and each egress switch 110 of the respective egress switch(es) from which the traffic may be output. In these examples, the traffic assessment system 104 may assess the traffic based on a comparison of the capacity of the multiple stage switch network 102, and the resource requirement value for each ingress switch and egress switch. In some more particular examples, the traffic assessment system 104 may calculate the resource requirement value for each ingress switch as the sum of traffic-type requirement values for one or more different types of the traffic input to the ingress switch. Similarly, the traffic assessment system may calculate the resource requirement value for each egress switch as the sum of traffic-type requirement values for one or more different types of the traffic output from the egress switch.

Figure 6:
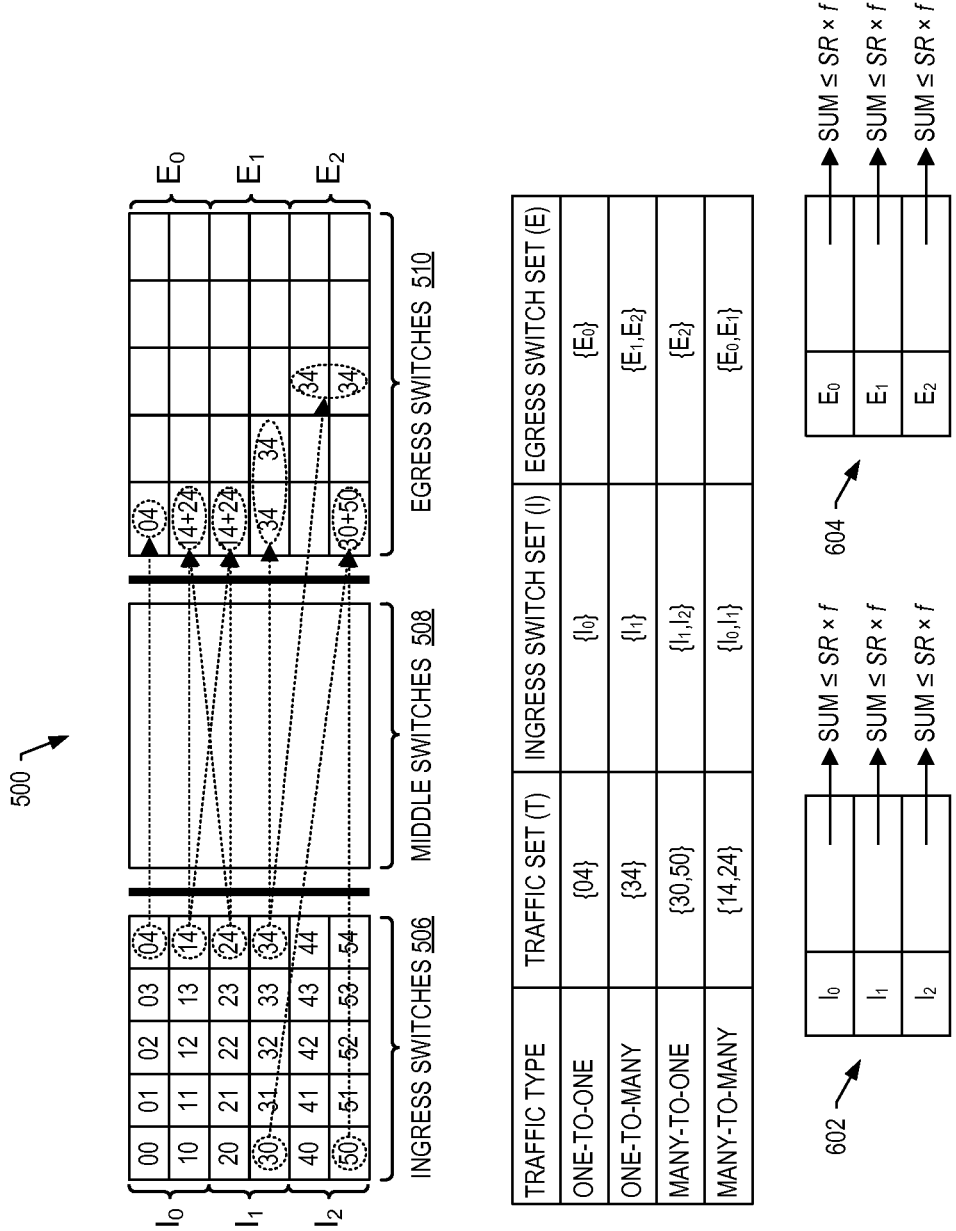
FIGS. 6-10 illustrate application of an algorithm to calculate traffic-type requirement values for one or more different types of traffic input that may be routed through the multiple stage switch network of FIG. 5, according to example implementations.

FIGS. 6-10 extend the example multiple stage switch network 500 of FIG. 5, and further illustrate the traffic assessment and algorithm according to which the traffic assessment system 104 may calculate the network resource requirement of traffic routed through the multiple stage switch network 102 of FIG. 1. As shown in FIG. 6, the traffic assessment system may allocate the ingress switches 506 of the multiple stage switch network with an ingress matrix 602 (I-matrix) including a row for each ingress switch ($I_0$, $I_1$, $I_2$). Likewise, the traffic assessment system may allocate the egress switches 510 with an egress matrix 604 (E-matrix) including a row for each egress switch ($E_0$, $E_1$, $E_2$).

For the ingress switch 506 for each row of the I-matrix is allocated, the traffic assessment system 104 may apply the algorithm to different types of the traffic input to the ingress switch to calculate traffic-type requirements for the respective different types of traffic. These traffic-type requirements may be accumulated (summed) in the row of the I-matrix—the sum representing the resource requirement value for the ingress switch. The traffic assessment system may perform the same process for the egress switch for each row of the E-matrix, with the sum of these traffic-type requirements representing the resource requirement value for the egress switch.

The traffic assessment system 104 may compare the resource requirement values for the ingress switches and egress switches for the rows the I-matrix and E-matrix to the capacity of the multiple stage switch network 500. As shown in FIG. 6, the capacity of the multiple stage switch network may be represented by the product of a number (SR) of at least a subset of the middle switches 508 of the multiple stage network, and number (f) of subchannels per middle switch of the subset. Here, the subset may include all of the middle switches or a lesser number of middle switches, such as in instances in which some of the middle switches may be allocated for other purposes such as redundancy or other error correction or mitigation purposes. The multiple stage network's capacity may at times be represented by a row sum bound to rows of the I-matrix and E-matrix.

In instances in which the I-matrix and E-matrix satisfy this row sum bound, the traffic may be considered feasible; otherwise, the traffic may be considered to exceed network capacity and thus infeasible. Feasible traffic may be routed through the multiple stage switch network 500. Infeasible traffic (or traffic routing plan including infeasible traffic), however, may require modification such as to the ingress switches 506 to which the traffic is input, the egress switches 510 from which the traffic is output, and/or the type of the traffic. The modified traffic/traffic routing plan may then be assessed to determine its feasibility, which may repeat until the traffic/traffic routing plan becomes feasible.

As indicated above, the algorithm according to which the traffic assessment system 104 may calculate the network resource requirement of traffic may be specific to the type of the traffic, but generalized to any specific route of the traffic through the multiple stage switch network 102. FIGS. 7-10 illustrate the algorithm with respect to one-to-one, one-to-many, many-to-one and many-to-many traffic, and with continued reference to the example multiple stage switch network 500.

Figure 7:
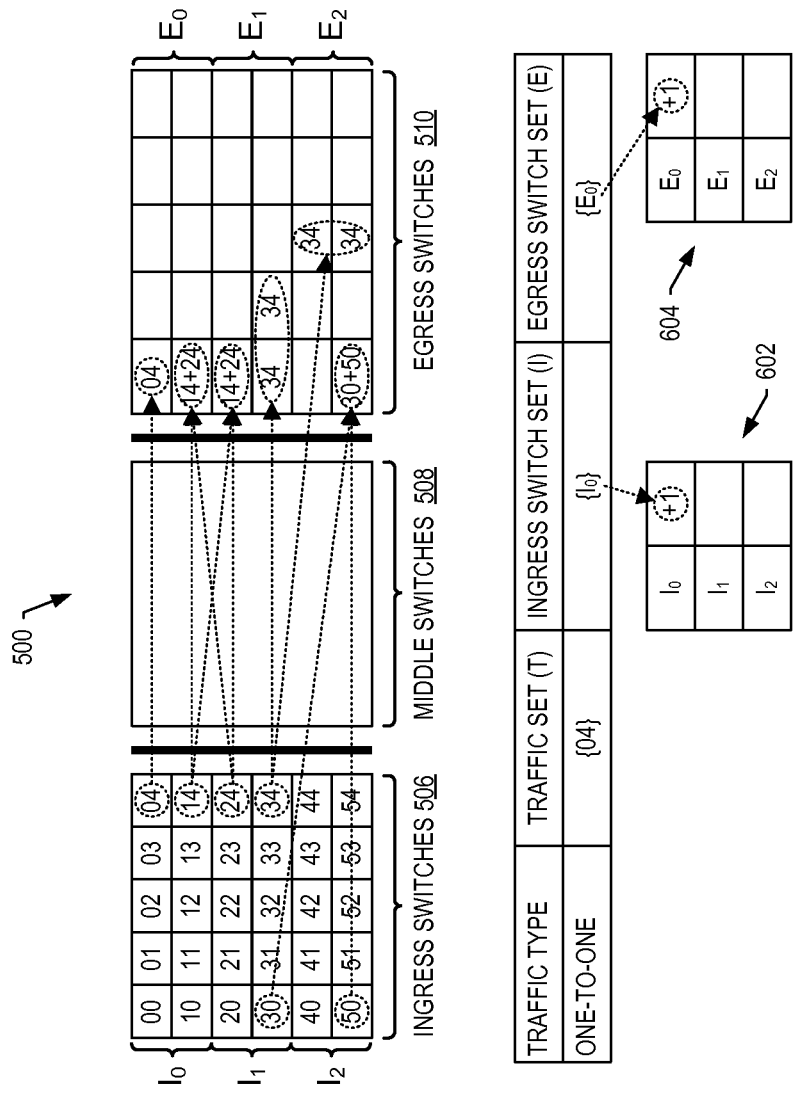

FIG. 7 illustrates an example of the algorithm for one-to-one traffic in which, again, traffic from an input port/ingress switch 506 is routed to a respective output port/egress switch 508. For each input port/ingress switch from which one-to-one traffic is routed, the algorithm may add a traffic-type requirement value of 1 to a respective row of the I-matrix. And for each output port/egress switch to which one-to-one traffic is routed, the algorithm may add a traffic-type requirement value of 1 to a respective row of the E-matrix.

Figure 8:
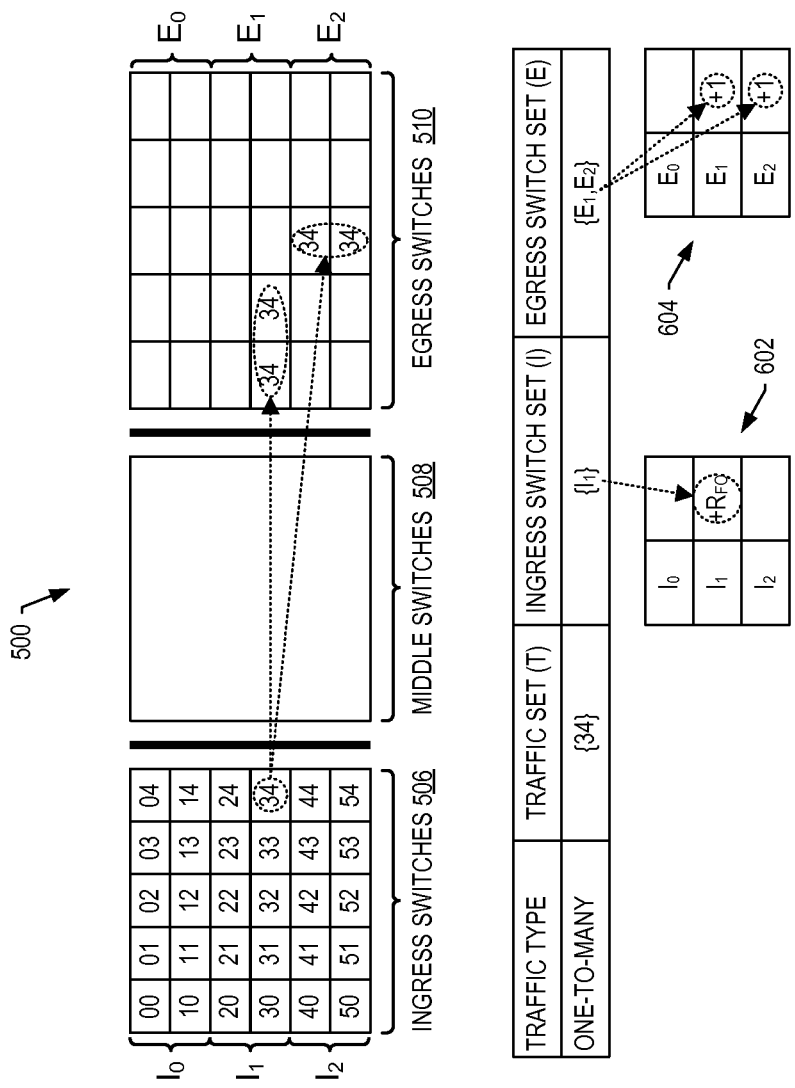

FIG. 8 illustrates an example of the algorithm for one-to-many traffic in which, again, traffic from an input port/ingress switch 506 is routed to multiple output ports/egress switches 508. For each output port/egress switch to which one-to-many traffic is routed, similar to before, the algorithm may add a traffic-type requirement value of 1 to a respective row of the E-matrix. On the other hand, for each input port/ingress switch from which one-to-many traffic is routed, the algorithm may calculate and add a traffic-type requirement value $R_{FO}$ to a respective row of the I-matrix.

The value $R_{FO}$ may be calculated in a number of different manners; and in some examples, $R_{FO}$ may include a (tunable) performance parameter selected to favor more or less network resource usage at the ingress switches 506 to route the traffic through the multiple stage switch network 500. One example of a suitable manner of calculating $R_{FO}$ is as follows:

$$R_{FO}(\alpha, SR) = \max(1, \lceil \alpha \min(SR, |E|/I|) \rceil)$$

In the above expression, $\alpha$ represents the performance parameter, $\lceil \; \rceil$ represents a ceiling function, and $|E|$ represents the number of elements in the set of egress switches (E) to which the one-to-many traffic is routed (i.e., the cardinality of E). In some examples, the performance parameter $\alpha$ may range between 0 and 1 (i.e., $\alpha \in (0,1)$), with a value of 1 implying the greatest network usage at the ingress switches, and a value of 0 implying the least network usage at the ingress switches. In one particular example, $\alpha=1$ may be selected.

Figure 9:
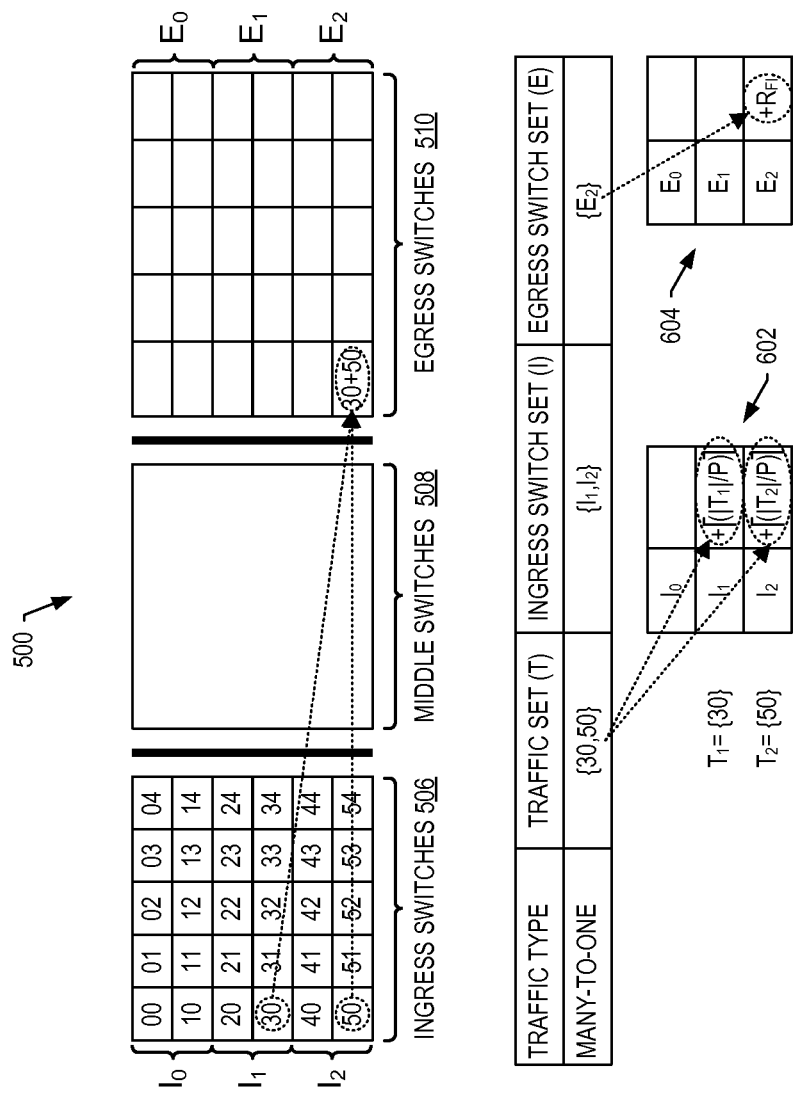

FIG. 9 illustrates an example of the algorithm for many-to-one traffic in which, again, traffic from multiple input ports/ingress switches 506 is routed to an output port/egress switch 508. Here, the algorithm may partition the set of many-to-one traffic (T) by input port/ingress switch ($T_i$ for any traffic on switch $I_i$)—i representing the index of the ingress switches (e.g., i=1, 2, 3). For each input port/ingress switch $I_i$ from which many-to-one traffic is routed, then, the algorithm may calculate and add a traffic-type requirement value $\lceil (|T_i|/P) \rceil$ to a respective row of the I-matrix. In this expression, P represents a hardware constraint of the switches that limits the number of subchannels of traffic that may be combined on a single subchannel (e.g., P=4). In this regard, each stage in multiple stage switch network 500 may be thought of as a digital symmetric matrix (two-dimensional crossbar), and each of its output subchannels may be thought of as an adder with P inputs.

For each output port/egress 508 switch to which many-to-one traffic is routed, the algorithm may calculate and add a traffic-type requirement value $R_{FI}$ to a respective row of the E-matrix. The value $R_{FI}$ may be calculated in a number of different manners; and in some examples, $R_{FI}$ may include a (tunable) performance parameter selected to favor more or less network resource usage at the middle switches 508 to route the traffic through the multiple stage switch network 500. One example of a suitable manner of calculating $R_{FI}$ is as follows:

$$R_{FI}(\beta, P) = \left\lceil \frac{\sum_{k=0}^{r-1} \left\lceil \frac{|T_k|}{\beta \times P} \right\rceil}{\beta \times P} \right\rceil$$

In the above expression, $\beta$ represents the performance parameter, and $|T_k|$ represents the number of elements in the set of one-to-many traffic (T) routed from any of r input ports/ingress switches 506 (i.e., the cardinality of $T_k$). In some examples, the performance parameter $\beta$ may range between 0 and 1 (i.e., $\beta \in (0,1)$), with a value of 1 implying the least network usage at the middle switches 508, and a value of 0 implying the most network usage at the middle switches. In one particular example, $\beta=0.75$ may be selected.

Figure 10:
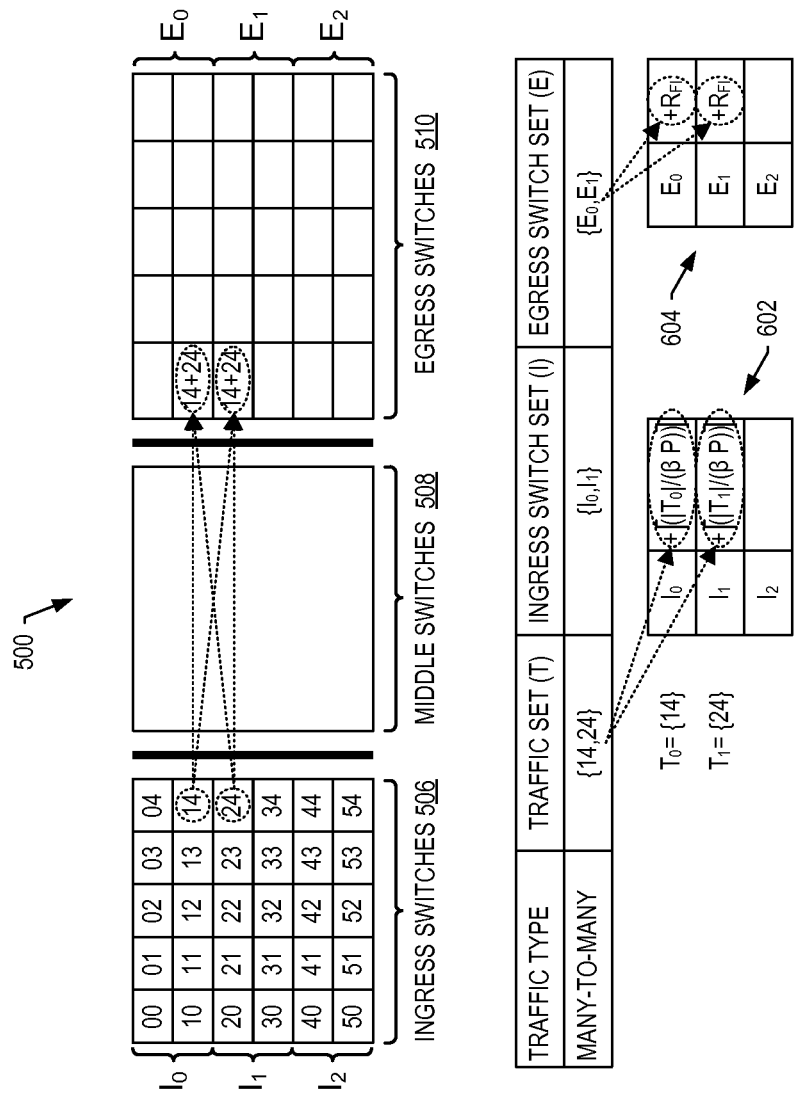

FIG. 10 illustrates an example of the algorithm for many-to-many traffic in which, again, traffic from multiple input ports/ingress switches 506 is routed to multiple output ports/egress switches 508. Similar to above, the algorithm may partition the set of many-to-one traffic (T) by input port/ingress switch ($T_i$ for any traffic on switch $I_i$). For each input port/ingress switch $I_i$ from which many-to-many traffic is routed, then, the algorithm may calculate and add a traffic-type requirement value $\lceil (|T_i|/(\beta P)) \rceil$ to a respective row of the I-matrix. And similar to above for many-to-one traffic, for each output port/egress switch to which many-to-many traffic is routed, the algorithm may calculate and add a traffic-type requirement value $R_{FI}$ to a respective row of the E-matrix.

As indicated above, the traffic assessment system 104 may assess traffic including one or more distinct traffic of any of a number of different types, such as one-to-one, one-to-many, many-to-one and/or many-to-many. The traffic may be traffic to be routed through the multiple stage switch network 102, existing traffic on the multiple stage switch network, or some combination of traffic to be routed through and any existing traffic on the multiple stage switch network.

Figure 11:
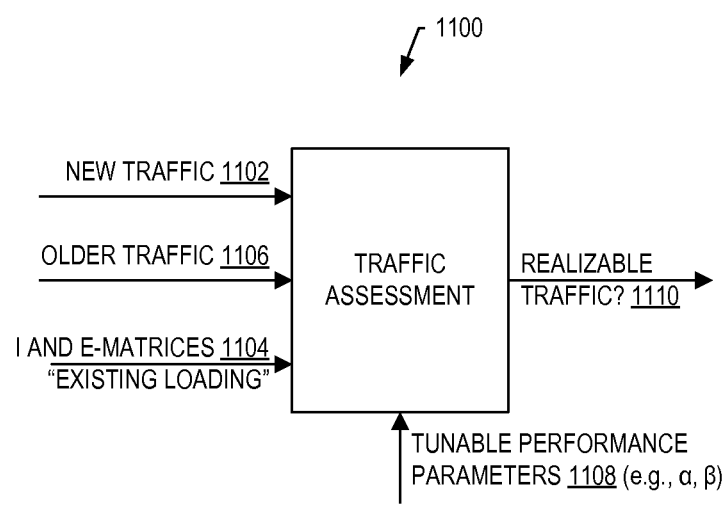
FIG. 11 is a block diagram of a traffic assessment system, according to example implementations.

FIG. 11 illustrates one example of a traffic assessment system 1100, which in some examples may correspond to the traffic assessment system 104 of FIG. 1. In the illustrated example, the traffic assessment system may be configured to assess traffic to be routed through a multiple stage switch network such as the multiple stage switch network 500 of FIG. 5. As shown, the traffic assessment system may be configured to receive an indication of new traffic 1102 to be routed through a multiple stage switch network such as multiple stage switch network 102. Here, the indication may be provided by distinct traffic of a particular type to be from multiple input ports/ingress switches 506 is routed to an output port/egress switch 508

The traffic assessment system 1100 may also receive an indication of existing traffic on the multiple stage switch network 500. In some examples, the indication of existing traffic may be provided in a manner similar to the indication of new traffic. Additionally or alternatively, the indication of at least some if not all of the existing traffic may be provided by I and E-matrices 1102 in which traffic-type requirement values for the existing traffic have been accumulated.

While in some examples it may be desirable to assess new traffic 1102 to be routed through the multiple stage switch network 500, it may be additionally or alternatively desirable to assess any of the existing traffic that may be removed from the multiple stage switch network (older traffic 1106). In these instances, the traffic assessment system 1100 may receive an indication of this older traffic in addition to or in lieu of the indication of new traffic, and the indication of older traffic may be provided in a manner similar to that of the new traffic.

The traffic assessment system 1100 may implement the algorithm described above to calculate traffic-type requirement values and thus the network resource requirement of traffic on the network after adding the new traffic 1102 and/or removing the older traffic 1106, and may update the I and E-matrices 1104 along the way. For at least some types of traffic, the algorithm may include (tunable) performance parameters (e.g., $\alpha$, $\beta$). The traffic assessment system may be preconfigured with values of these performance parameters, or in some examples, the traffic assessment system may be provided with values of the performance parameters 1108.

In a manner similar to that described above, the traffic assessment system 1100 may compare the resource requirement values for the ingress switches 506 and egress switches 508 to the multiple stage network's capacity. Again, this capacity may be represented by a row sum bound to rows of the I-matrix and E-matrix. In instances in which the I-matrix and E-matrix satisfy this row sum bound, the traffic assessment system may consider the traffic or its traffic routing plan feasible; otherwise, the traffic assessment system may consider the traffic/traffic routing plan to exceed network capacity and thus infeasible. The traffic assessment system may then output an indication of the feasibility 1100 of the traffic/traffic routing plan. The indication may generally indicate feasibility (or infeasibility) of the traffic/traffic routing plan, or perhaps feasible traffic/traffic routing plan closely approaching capacity of the multiple stage switch network 500. In some examples, the indication may provide additional information such as the resource requirement values for the ingress switches 506 and egress switches 508, which may indicate any overloaded switches or bottlenecks in the multiple stage switch network. This additional information may be used in the case of infeasible traffic/traffic routing plan or that approaching capacity as a basis for its modification.

Figure 12:
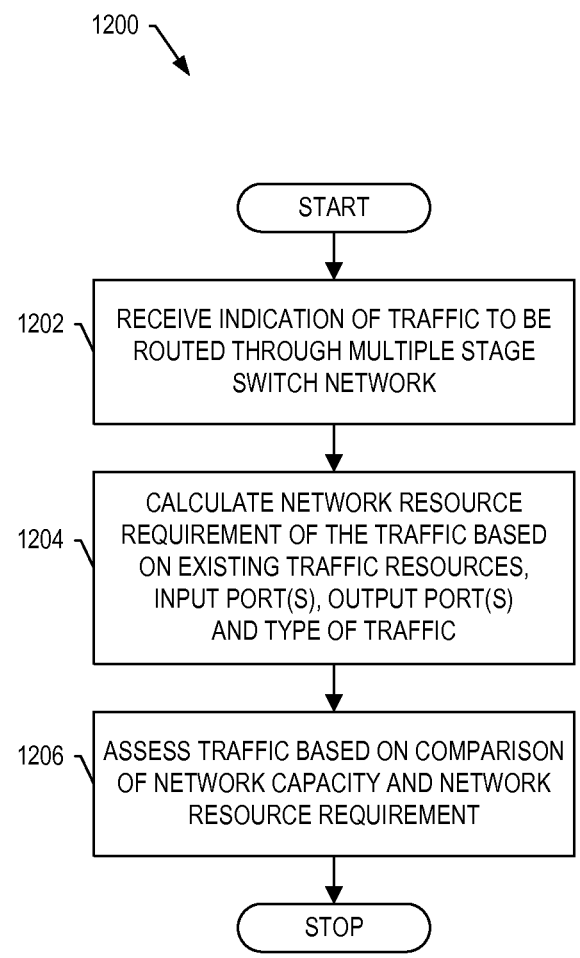
FIG. 12 illustrates a flowchart including various operations in a method according to example implementations of the present disclosure.

FIG. 12 illustrates various operations in a method 1200 for assessing traffic through a multiple stage switch network, according to some example implementations of the present disclosure. As shown at block 1202 and with reference to FIGS. 1 and 4, the method may include receiving an indication of traffic to be routed through a multiple stage switch network 102 configured to route the traffic from one or more input ports 402 to one or more output ports 404 according to a type of the traffic. The method may include calculating a network resource requirement of the traffic based on the input port(s), output port(s) and type of the traffic, and also in some examples, the existing traffic resources, as shown at block 1204. Here, the network resource requirement may be calculated according to an algorithm specific to the type of the traffic, but generalized to any specific route of the traffic through the multiple stage switch network. And the method may include assessing the traffic based on a comparison of a capacity of the multiple stage switch network, and the network resource requirement of the traffic, as shown at block 1206.

According to example implementations of the present disclosure, the traffic assessment system 104, 1100 may be implemented by various means, which may include hardware, alone or under direction of one or more computer programs from a computer-readable storage medium. In some examples, one or more apparatuses may be provided that are configured to function as or otherwise implement the assessment system shown and described herein. In examples involving more than one apparatus, the respective apparatuses may be connected to or otherwise in communication with one another in a number of different manners, such as directly or indirectly via a wired or wireless network or the like.

Figure 13:
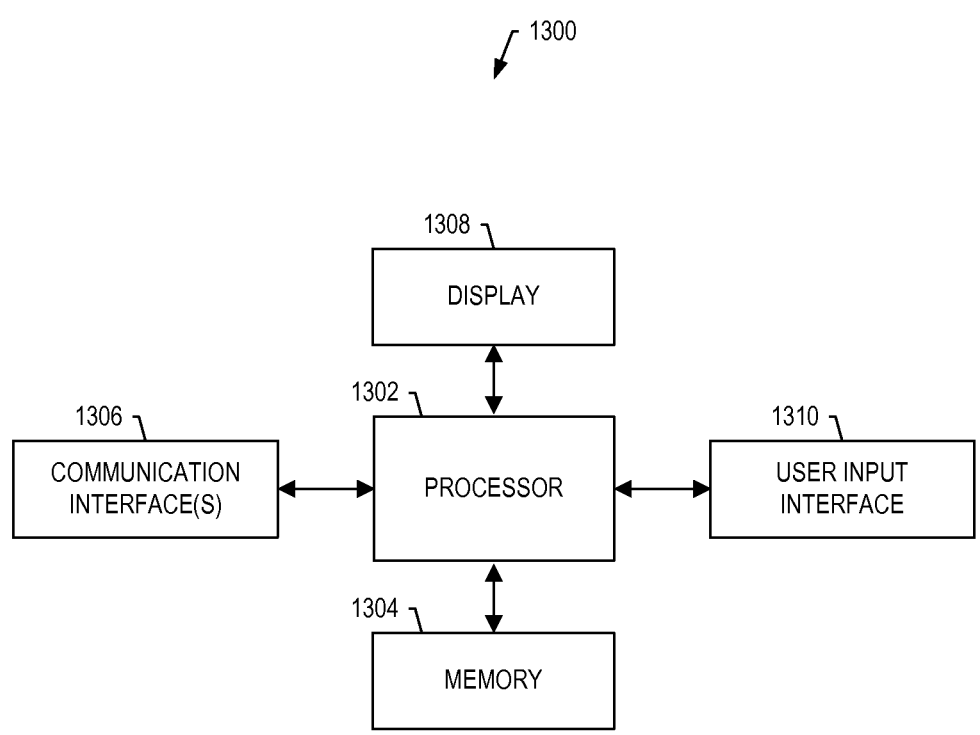
FIG. 13 illustrates an apparatus for implementation of a traffic assessment system, according to some example implementations of the present disclosure.

Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. FIG. 13 illustrates an apparatus 1300 for implementation of the traffic assessment system 104, 1100 according to some example implementations of the present disclosure. The apparatus may include one or more of each of a number of components such as, for example, a processor 1302 connected to a memory 1304.

The processor 1302 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1304 (of the same or another apparatus).

The processor 1302 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 1304 is generally any piece of computer hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory 1304, the processor 1302 may also be connected to one or more interfaces for displaying, transmitting and/or receiving information. The interfaces may include at least one communications interface 1306 and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 1308 and/or one or more user input interfaces 1310. The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus 1300, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which this disclosure pertains having the benefit of the teachings presented in the foregoing description and the associated drawings. Therefore, it is to be understood that the disclosure not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of a system for assessing traffic through a multiple stage switch network including a number of ingress switches, a number of middle switches and a number of egress switches, the traffic to be input on one or more input ports to a respective one or more ingress switches of the number of ingress switches, and output on one or more output ports from a respective one or more egress switches of the number of egress switches, the number of middle switches determining a capacity of the multiple stage switch network, the apparatus comprising a processor and a memory storing executable instructions that in response to execution by the processor cause the apparatus to at least:

receive an indication of the traffic to be routed through the multiple stage switch network configured to route the traffic from the one or more input ports to the one or more output ports according to a type of the traffic;

calculate a network resource requirement of the traffic based on the one or more input ports, the one or more output ports and the type of the traffic, the network resource requirement being calculated according to an algorithm specific to the type of the traffic, but generalized to any specific route of the traffic through the multiple stage switch network;

assess the traffic based on a comparison of the capacity of the multiple stage switch network, and the network resource requirement of the traffic; and in at least one instance in which the traffic so assessed exceeds the capacity of the multiple stage switch network based on the network resource requirement, modify the ingress switches, the egress switches or the traffic through the multiple stage switch network, wherein the apparatus being caused to calculate the network resource requirement includes being caused to calculate a resource requirement value according to the algorithm for each ingress switch of the respective one or more ingress switches, and each egress switch of the respective one or more egress switches, wherein the apparatus being caused to calculate the resource requirement value for each ingress switch includes being caused to calculate a sum of traffic-type requirement values for one or more different types of the traffic input to the ingress switch, and wherein the apparatus being caused to calculate the resource requirement value for each egress switch includes being caused to calculate a sum of traffic-type requirement values for one or more different types of the traffic output from the egress switch.

2. The apparatus of claim 1,
wherein the apparatus being caused to assess the traffic includes being caused to assess the traffic based on the comparison of the capacity of the multiple stage switch network, and the resource requirement value for each ingress switch and egress switch.

3. The apparatus of claim 1, wherein the type of the traffic is one-to-many or many-to-many in which traffic from an input port of the one or more input ports is routed to multiple output ports of the one or more output ports, and wherein the algorithm includes a performance parameter selected to favor more or less network resource usage at the ingress switches to route the traffic through the multiple stage switch network.

4. The apparatus of claim 1, wherein the type of the traffic is many-to-one or many-to-many in which traffic from multiple input ports of the one or more input ports is routed to an output port of the one or more output ports, wherein the algorithm includes a performance parameter selected to favor more or less network resource usage at the middle switches to route the traffic through the multiple stage switch network.

5. The apparatus of claim 1, wherein the apparatus being caused to calculate the network resource requirement includes being caused to calculate the network resource requirement of the traffic and any other, existing traffic on the multiple stage switch network, and wherein the apparatus being caused to assess the traffic includes being caused to assess the traffic based on the comparison of the capacity of the multiple stage switch network, and the network resource requirement of the traffic and existing traffic.

6. A method for assessing traffic through a multiple stage switch network including a number of ingress switches, a number of middle switches and a number of egress switches, the traffic to be input on one or more input ports to a respective one or more ingress switches of the number of ingress switches, and output on one or more output ports from a respective one or more egress switches of the number of egress switches, the number of middle switches determining a capacity of the multiple stage switch network, the method comprising:

receiving an indication of the traffic to be routed through the multiple stage switch network configured to route the traffic from the one or more input ports to the one or more output ports according to a type of the traffic;

calculating a network resource requirement of the traffic based on the one or more input ports, the one or more output ports and the type of the traffic, the network resource requirement being calculated according to an algorithm specific to the type of the traffic, but generalized to any specific route of the traffic through the multiple stage switch network;

assessing the traffic based on a comparison of the capacity of the multiple stage switch network, and the network resource requirement of the traffic; and in at least one instance in which the traffic so assessed exceeds the capacity of the multiple stage switch network based on the network resource requirement, modifying the ingress switches, the egress switches or the traffic through the multiple stage switch network, wherein calculating the network resource requirement includes calculating a resource requirement value according to the algorithm for each ingress switch of the respective one or more ingress switches, and each egress switch of the respective one or more egress switches, wherein calculating the resource requirement value for each ingress switch includes calculating a sum of traffic-type requirement values for one or more different types of the traffic input to the ingress switch, and wherein calculating the resource requirement value for each egress switch includes calculating a sum of traffic-type requirement values for one or more different types of the traffic output from the egress switch.

7. The method of claim 6,
wherein assessing the traffic includes assessing the traffic based on the comparison of the capacity of the multiple stage switch network, and the resource requirement value for each ingress switch and egress switch.

8. The method of claim 6, wherein the type of the traffic is one-to-many or many-to-many in which traffic from an input port of the one or more input ports is routed to multiple output ports of the one or more output ports, and
wherein the algorithm includes a performance parameter selected to favor more or less network resource usage at the ingress switches to route the traffic through the multiple stage switch network.

9. The method of claim 6, wherein the type of the traffic is many-to-one or many-to-many in which traffic from multiple input ports of the one or more input ports is routed to an output port of the one or more output ports,
wherein the algorithm includes a performance parameter selected to favor more or less network resource usage at the middle switches to route the traffic through the multiple stage switch network.

10. The method of claim 6, wherein calculating the network resource requirement includes calculating the network resource requirement of the traffic and any other, existing traffic on the multiple stage switch network, and
wherein assessing the traffic includes assessing the traffic based on the comparison of the capacity of the multiple stage switch network, and the network resource requirement of the traffic and existing traffic.

11. A computer-readable storage medium for assessing traffic through a multiple stage switch network including a number of ingress switches, a number of middle switches and a number of egress switches, the traffic to be input on one or more input ports to a respective one or more ingress switches of the number of ingress switches, and output on one or more output ports from a respective one or more egress switches of the number of egress switches, the number of middle switches determining a capacity of the multiple stage switch network, the computer-readable storage medium being non-transitory and having computer-readable program code portions stored therein that in response to execution by a processor, cause an apparatus to at least:

receive an indication of the traffic to be routed through the multiple stage switch network configured to route the traffic from the one or more input ports to the one or more output ports according to a type of the traffic;

calculate a network resource requirement of the traffic based on the one or more input ports, the one or more output ports and the type of the traffic, the network resource requirement being calculated according to an algorithm specific to the type of the traffic, but generalized to any specific route of the traffic through the multiple stage switch network;

assess the traffic based on a comparison of the capacity of the multiple stage switch network, and the network resource requirement of the traffic; and in at least one instance in which the traffic so assessed exceeds the capacity of the multiple stage switch network based on the network resource requirement, modify the ingress switches, the egress switches or the traffic through the multiple stage switch network, wherein the apparatus being caused to calculate the network resource requirement includes being caused to calculate a resource requirement value according to the algorithm for each ingress switch of the respective one or more ingress switches, and each egress switch of the respective one or more egress switches, wherein the apparatus being caused to calculate the resource requirement value for each ingress switch includes being caused to calculate a sum of traffic-type requirement values for one or more different types of the traffic input to the ingress switch, and wherein the apparatus being caused to calculate the resource requirement value for each egress switch includes being caused to calculate a sum of traffic-type requirement values for one or more different types of the traffic output from the egress switch.

12. The computer-readable storage medium of claim 11,
wherein the apparatus being caused to assess the traffic includes being caused to assess the traffic based on the comparison of the capacity of the multiple stage switch network, and the resource requirement value for each ingress switch and egress switch.

13. The computer-readable storage medium of claim 11, wherein the type of the traffic is one-to-many or many-to-many in which traffic from an input port of the one or more input ports is routed to multiple output ports of the one or more output ports, and
wherein the algorithm includes a performance parameter selected to favor more or less network resource usage at the ingress switches to route the traffic through the multiple stage switch network.

14. The computer-readable storage medium of claim 11, wherein the type of the traffic is many-to-one or many-to-many in which traffic from multiple input ports of the one or more input ports is routed to an output port of the one or more output ports,
wherein the algorithm includes a performance parameter selected to favor more or less network resource usage at the middle switches to route the traffic through the multiple stage switch network.

15. The computer-readable storage medium of claim 11, wherein the apparatus being caused to calculate the network resource requirement includes being caused to calculate the network resource requirement of the traffic and any other, existing traffic on the multiple stage switch network, and
wherein the apparatus being caused to assess the traffic includes being caused to assess the traffic based on the comparison of the capacity of the multiple stage switch network, and the network resource requirement of the traffic and existing traffic.

\* \* \* \* \*